United States Patent
Brunsen et al.

(10) Patent No.: US 8,381,897 B2
(45) Date of Patent: Feb. 26, 2013

(54) SORTING SYSTEM HAVING A VERTICAL SORTER

(75) Inventors: Hermann Brunsen, Beckum (DE); Heino Heitplatz, Drensteinfurt (DE); Andreas Hintz, Schlieren (CH)

(73) Assignee: Beumer Maschinenfabrik GmbH & Co., Beckum (DE)

( * ) Notice: Subject to any disclaimer, the term of this patent is extended or adjusted under 35 U.S.C. 154(b) by 189 days.

(21) Appl. No.: 12/993,967

(22) PCT Filed: May 13, 2009

(86) PCT No.: PCT/EP2009/003379
§ 371 (c)(1),
(2), (4) Date: Feb. 10, 2011

(87) PCT Pub. No.: WO2009/141077
PCT Pub. Date: Nov. 26, 2009

(65) Prior Publication Data
US 2011/0127140 A1    Jun. 2, 2011

(30) Foreign Application Priority Data

May 21, 2008 (DE) .......................... 10 2008 024 586

(51) Int. Cl.
*B65G 47/46* (2006.01)
(52) U.S. Cl. .................................. 198/370.04
(58) Field of Classification Search ............. 198/370.03, 198/370.04, 370.05
See application file for complete search history.

(56) References Cited

U.S. PATENT DOCUMENTS

| | | | | |
|---|---|---|---|---|
| 2,344,596 A | * | 3/1944 | Carmina | 209/560 |
| 3,231,066 A | * | 1/1966 | Harrison et al. | 198/370.04 |
| 3,662,874 A | * | 5/1972 | Muller | 198/370.04 |
| 5,501,443 A | * | 3/1996 | Cote et al. | 270/52.14 |
| 5,839,566 A | * | 11/1998 | Bonnet | 198/370.04 |
| 6,231,293 B1 | * | 5/2001 | Ostholt et al. | 414/418 |
| 6,502,687 B1 | * | 1/2003 | Ayen et al. | 198/370.04 |

* cited by examiner

*Primary Examiner* — Gene Crawford
*Assistant Examiner* — Keith R Campbell
(74) *Attorney, Agent, or Firm* — Greer, Burns & Crain, Ltd.

(57) ABSTRACT

A sorting system having a vertical sorter for conveying and sorting parcel goods, including a plurality of sorting units provided at specified distances from one another extending over a closed conveyor belt along a traveling path and being connected with the conveyor belt and movable along the traveling path. Two reversing drums with horizontal rotational axes are provided, at least one of the reversing drums serving as the drive drum to reverse and drive the conveyor belt and the sorting units provided thereat around the horizontally oriented rotational axes. The conveyor belt is configured as a traction carrier. To this end the conveyor belt is reinforced by reinforcing apparatus for driving the sorting units. A sorting unit includes a moving device with wheels and is attached to the conveyor belt, the sorting unit including at least one parcel goods receiver which allows controlled discharge of a parcel.

17 Claims, 4 Drawing Sheets

SORTING SYSTEM HAVING A VERTICAL SORTER

BACKGROUND

The present invention relates to a sorting system having a vertical sorter in particular for conveying and sorting parcel goods such as is employed for example for conveying and sorting parcels or for sorting baggage in airports.

These vertical sorters are line sorters with a vertical reversal at the ends of the conveying line. Such vertical reversing takes place about an approximately horizontal axis. Vertical sorters are as a rule equipped with a plurality of carriages provided in succession to which one tilt tray or cross conveyor each is associated to sort out and redirect or transfer the conveyed parcel goods at predetermined or selectable points along the transport route.

Vertical sorters offer the advantage over sorting systems traveling through horizontal curves of providing a closed or very nearly closed conveying plane which facilitates conveying large-size parcel goods which extend over more than one sorting unit.

In the case of horizontal sorters including horizontal curves, parts, straps or loops sticking out from the parcel goods may get caught and jam between conveying units which may result in damage to the parcel goods or even in failure of the sorting system.

Vertical sorters offer the advantage of one continuous conveying surface in which jamming of protruding parcel goods parts is largely avoided.

Different sorting systems having vertical sorters have become known in the prior art. The sorting units of the sorting systems tend to be linked together at their front and rear ends so as to achieve on the whole a closed conveying train forming a conveying chain wherein each sorting unit comprises wheels supported on supporting rails of the sorting system. Thus each supporting unit with its associated wheels forms one chain link of the conveying chain.

The drawback of these sorting systems is the so-called polygonal effect resulting at the vertical end reversing points as the conveying chain is reversed. The reversing pulley has a circular diameter while the train of the sorting units can only pass through a polygon. The influence of the polygonal effect decreases with each sorting unit being shorter in length. This in turn increases the complexity since the quantity of the sorting units must be increased.

Furthermore, DE 697 19 044 T2 has disclosed a belt-carried tilt tray sorter with the tilting trays being spaced apart from one another in the longitudinal direction. The tilt trays are supported on an elastic conveyor belt supported by a slider bed for taking up and diverting the supporting forces.

For sorting out the parcel goods this known system uses movable trip members which can be positioned in the traveling path of an actuator to cause one side of the tray to lift, discharging the parcel goods.

The drawback of this known system is the mechanically controlled parcel goods discharge since the tilt tray control speed depends on the moving speed of the vertical sorter. Furthermore considerable acoustic pollution is involved due to the movable trip member hitting on the actuator of the tilt tray.

Another drawback of the known prior art is the flexibility of the endless conveyor belt which only allows limited prestressing since its elasticity causes elongation in the conveyor belt which will further increase with continuing operation.

SUMMARY

Against the background of the described prior art it is the object of the present invention to provide a sorting system having a vertical sorter which largely avoids the polygonal effect and permits high conveying speed at highest weight loads.

The sorting system having a vertical sorter according to the invention is in particular provided for conveying and sorting parcel goods and comprises a multitude of sorting units predetermined at specified distances from one another extending over a closed conveyor belt along a traveling path and being connected with the conveyor belt and movable along the traveling path. At least two reversing drums with horizontal rotational axes are provided. At least one reversing drum serves as the drive drum to reverse and drive the conveyor belt and the sorting units provided thereat around the horizontally oriented rotational axes. The conveyor belt is configured as a traction carrier and to this end it is reinforced by reinforcing means for driving the sorting units. At least one sorting unit comprises at least one moving device with wheels. At least one and in particular all of the sorting units are attached to the conveyor belt. The sorting unit comprises at least one parcel goods receiver which allows controlled discharge of parcel goods. If necessary, the sorting units and any parcel goods located on it are supported by the traction carrier.

The invention has many advantages. One considerable advantage of the invention is that the conveyor belt is configured as a traction carrier which both provides the traction forces for transporting the conveying units and supports the conveying units and the parcel goods located thereon. This is possible because the conveyor belt which is flexible per se is reinforced with reinforcing means in particular in the longitudinal direction such that the conveyor belt shows minimum elongation even in the case of high prestresses. This is very advantageous since different prestresses may occur in different places along the circumference of the traveling path which, if the traction carrier is highly extensible, results in locally variable elongation which in turn may cause the distances between the sorting units to vary in terms of time and location. The present invention allows constant and invariable distances between sorting units which in turn allows a substantially continuous conveying plane.

There is the further advantage of a considerable reduction or avoidance of the polygonal effect and the possibility of a high load-bearing capacity. This allows to avoid repeated tension variations in the traction carrier caused by polygonal effects so as to reduce mechanical loads and also vibrations and noise emission. This results in reduced mechanical loads on the drive and lower noise exposure.

A horizontally oriented rotational axis in the sense of the present application is understood to mean a rotational axis of a rotary drum of a vertical sorter. Such a rotational axis may be oriented precisely horizontal. Or else the rotational axis may be inclined e.g. a few degrees from the horizontal.

Preferably every sorting unit is provided with a motor which serves for motor-controlled actuation of the parcel goods receiver to individually control the sorting out or discharging of the respective parcel goods from the parcel goods receivers.

In preferred embodiments of the invention the conveyor belt consists of an elastic material equipped with the reinforcing means to allow high strength and prestress along with low elongation of the conveyor belt. This will ensure identical conditions even in the case of high or highest loads on the sorting system since elongation will be minimal due to the reinforcing means which are in particular embedded.

The reinforcing means may comprise a plurality of adjacent reinforcing cables or may be configured as a plurality of adjacent reinforcing cables disposed in the longitudinal direction and extending around the entire traveling path in particular in the longitudinal direction.

The ends of the reinforcing cables are preferably connected with one another. The connection may for example be a screw-connection with the two ends being compressed and pinched to one another in a clamping position.

It is conceivable to employ for the reinforcing means reinforcing cables consisting of twisted or interlaced wires. Or else it is conceivable to employ other reinforcing cables or reinforcing wires. Reinforcing means of multiwire fibers may also be referred to as reinforcing cable in the sense of the present application.

In particularly preferred configurations the reinforcing means comprise at least one steel rope and in particular a plurality of steel ropes which are in particular embedded in the conveyor belt configured as a traction carrier.

Using steel ropes offers considerable advantages since this allows to provide conveyor belts having highest load-bearing capacities.

While the elastic material of the conveyor belt in particular consists of rubber or the like, thus enabling good adhesion on the drive system, the steel ropes ensure low elongation of the conveyor belt in the longitudinal direction. By way of embedding the steel rope the exterior properties of the elastic material such as rubber are maintained while on the other hand the strength characteristics of the steel rope are a positive contribution to the properties of the traction carrier.

Or else it is conceivable for the reinforcing means to comprise at least one reinforcing cable of reinforcing fibers.

For example fibrous materials may be employed such as they are used in manufacturing fibrous composite materials. It is conceivable for example to use carbon, kevlar, and glass fibers or the like as reinforcing fibers in the conveyor belt. These fibers also enable high strength in the longitudinal direction.

In all of the configurations of the sorting system according to the invention the sorting units are preferably firmly connected with the conveyor belt at least in one position. The sorting units are in particular screwed to the conveyor belt at the attachment points by a plurality of screws.

Particularly preferably the sorting units are connected with the traction carrier in two connection points spaced in the longitudinal direction.

Preferably the sorting units are coupled to the traction carrier in first connection points to be stationary but free to rotate. The sorting units are in particular coupled to the traction carrier to be longitudinally displaceable in second connection points. Particularly preferably the sorting units are coupled to the traction carrier to be free to rotate in at least some connection points. In particularly preferred configurations and more specific embodiments the sorting units are coupled to the traction carrier to be each free to rotate and longitudinally displaceable in second connection points while being advantageously connected with or coupled to the traction carrier stationary but free to rotate in first connection points.

In particular when a plurality of parallel reinforcing cables is employed extending in the longitudinal direction of the conveyor belt, the attachment screws for the sorting units may be screwed through the conveyor belt between cables, with the screw heads and/or washers reaching behind two or more of the reinforcing cables so as to result in a firm, reliable seat of the sorting units on the conveyor belt which also withstands high and highest loads.

In the desired high conveying speeds reaching 10 m/s or higher, high centrifugal forces arise in particular at the reversing points at the top ends of the vertical sorter. Since each of the sorting units has a considerable permanent weight due to the mechanics and the in particular electrical motor drive they are provided with, attachment of the sorting unit to the conveyor belt must be robust to achieve the desired conveying and sorting speeds.

In preferred more specific embodiments each of the sorting units is connected with the conveyor belt in the region of the two longitudinal ends. One of the links is preferably configured in the region of the traction carrier by way of a fixed pivot point while the other link is only a vertical fixing to the conveyor belt. This link thus allows a longitudinal adjustment in the conveying direction which is in particular advantageous for the belt reversal. Contrary to a firm link, the described type of link allows to significantly reduce the accelerations acting on the moving devices and parcel goods receivers in moving onto and off the reversing drums. In this way a particularly reliable connection of the sorting unit with the conveyor belt is achieved.

The sorting units are in particular provided with a moving device each connected with the conveyor belt at their longitudinal ends. The moving device is provided with the parcel goods receiver extending at the conveyor belt in particular over a length greater than the length of the moving device such that despite the double attachment of the moving device to the conveyor belt the polygonal effect at the reversing points will be minimal or in the described preferred attachment there will be none.

In this configuration the distance of the connection points of a sorting unit with the conveyor belt in the longitudinal direction is shorter by at least 10, in particular by at least 20%, than the length of the parcel goods receiver in the conveying direction. In preferred configurations the distance of the attachment points at the conveyor belt may be configured smaller than half the length of the parcel goods receiver.

In all of the configurations at least one parcel goods receiver and in particular all of the parcel goods receivers are configured as a tilt tray which by means of the motor can be brought from a transport position to a discharge position or sorting-out position inclined at least towards one side. Each parcel goods receiver is in particular tiltable to either side so as to allow sorting out the received parcel goods in the transport direction both to the one and to the other side. This doubles the sorting options of the sorting system since a corresponding quantity of output stations may be provided not only on one side but on the other side of the sorting system as well.

In all of the configurations described above the conveying surface of the parcel goods receivers of the sorting units forms a substantially closed conveying surface preferably in the upper flight. This allows to sort parcel goods the length of which considerably exceeds the length of one single parcel goods receiver. In these cases, two, three, or more sorting units are driven in parallel and they also discharge the received parcel goods in synchrony. Optionally discharge occurs offset in time so as to have the parcel goods rotate and it aligns maximally transverse to the sorter axis or longitudinal sorter direction.

In preferred configurations the lower flight of the vertical sorter may be provided with at least two belt reversing stations to allow additional sorting in the lower flight wherein both loading of the goods and discharge of the goods traveling to the next belt reversing station takes place in the lower flight. Overall this increases the capacity of the sorting system.

In preferred more specific embodiments and configurations at least one sorting unit is provided with at least one conveyor belt running opposite to the conveying direction. Preferably one conveyor belt is associated to each sorting unit or two conveyor belts are associated to each sorting unit. The conveyor belt or the pair of conveyor belts is/are preferably disposed on the side of the conveyor belt.

In this configuration the parcel to be conveyed is placed on the conveyor belt for transport and sorting. When a parcel is intended to be discharged the conveyor belt is moved in the opposite direction in a provided discharge station so as to reduce the effective speed of the conveyed parcel in the conveying direction.

Preferably this allows to reduce the effective speed of the conveyed parcel in the conveying direction to zero. This is achieved with the opposite speed of the conveyor belt at parcel discharge being equal to the speed of the conveyor belt in the conveying direction. In this way a particularly careful discharge of the parcel goods is achieved. Also, discharged parcel goods may be stacked since the speed in the conveying direction is zero and thus a following parcel is accurately placed on a preceding parcel. Precise discharge side by side is also possible by way of appropriate control.

Another advantage of such a configuration is that the sorting system can be used in the lower flight since the conveyor belt disposed laterally comprises a usable conveyor belt in the lower flight and in the upper flight of the conveyor belt. This requires that the sorting process be terminated in the upper flight or in the lower flight of the conveyor belt.

In all of the configurations in particular at least one of the ends is provided with a drive drum transmitting the driving force to the conveyor belt. To enhance force transmission, fins may be provided at the conveyor belt in the transverse direction or the conveyor belt configured as a traction carrier is configured as a toothed belt the teeth of which engage in grooves of the drive drum.

The other end is preferably provided with a reversing drum. It is also conceivable to provide both ends with drive drums operating in synchrony. Applying the driving force via a drive drum is advantageous because these drives are highly efficient. In the prior art, linear drives tend to be employed, the sorting units of which virtually form part of the drive system. The required electric power is transmitted through the gap between the rail system and the sorting units. Although this driving energy transmission works well, it does so at reduced efficiency such that the present invention saves a considerable portion of the driving energy.

In all of the configurations the conveying direction is in particular reversible.

Advantageously it is conceivable for at least one height difference to be provided along the traveling path in the upper flight such that one incline is or multiple successive inclines are provided on the traveling path in the upper flight such that receiving and/or discharge of goods to be conveyed may be possible at different height levels.

Preferably the vertical sorter is oriented in an approximately straight line wherein the traveling path may be provided with slight horizontal curves in which the sorting units may incline the conveyor belt receivers so as to prevent inadvertent dropping of the parcel goods to be conveyed due to centrifugal forces.

Each sorting unit preferably comprises one moving device which is in particular configured as a carriage. Each moving device in particular comprises wheels guided in rails at least in the horizontal sections. Horizontal and vertical wheels are preferably provided to allow a vertical or horizontal support of each of the sorting units at the guide rails. The guide rails serve for one to transmit the weight force in elongated sorting systems and for another to reduce vibrations which may occur in the vertical direction when conveyed parcel goods are received and discharged.

The belt ends of the traction carrier are interconnected in particular at a belt connection to be tension-proof but preferably detachable so as to allow detaching the belt e.g. for maintenance. Between the two belt ends an inner shaped part, and on the outside preferably two outer shaped parts opposite one another are disposed to precisely divert the belt ends outwardly. In this position multiple screw connections are provided in particular distributed over the width of the traction carrier to ensure a tension-proof connection of the traction carrier.

Particularly preferably the reinforcing means and in particular the reinforcing cables emerging from a belt end are connected with one another at said end at a cable connection. In this way each of the reinforcing cables is secured against being pulled out so as to achieve better load-bearing capacity and increased operational safety. Particularly preferably the structures of both of the belt ends are similar or identical.

The reinforcing cables emerging from the belt end are in particular twisted around each other. Or else the wires of the reinforcing cables may be twisted around each other.

Particularly preferably the reinforcing cables of each of the belt ends are potted at one connection box each in a binding agent such as synthetic resin or an adhesive or a metal, in particular low-melting.

The separate connection of the wire ends for each of the belt ends results on the whole in a detachable connection of the traction carrier such that the belt may be opened for example for maintenance or the like and then it may readily be closed again.

The cable connection is advantageously provided to allow adjusting the belt length for example to allow defined adjustment of the distance between two conveying units on the belt. To allow defined adjustment of the belt length, exchangeable spacers can be inserted in each of the cable connections. By selecting a suitable thickness, the desired belt length can be specifically adjusted and adapted to current conditions.

BRIEF DESCRIPTION OF THE DRAWINGS

Further advantages and features can be taken from the exemplary embodiments described below with reference to the enclosed figures.

The figures show in:

FIG. 5 a schematic view of the link of the sorting units to the conveyor belt;

DETAILED DESCRIPTION

With reference to the FIGS. 1 to 7 an embodiment of the present invention will now be described in detail.

Figure 1:
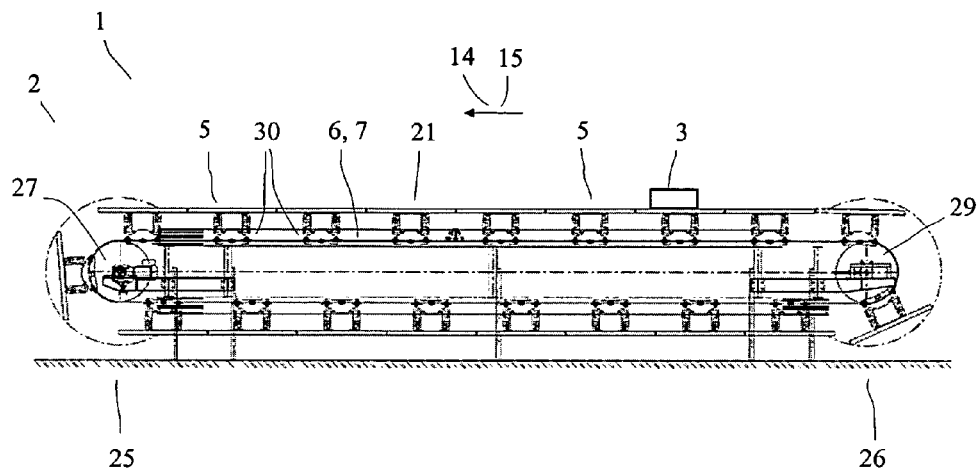
FIG. 1 a schematic side view of a sorting system according to the invention.
Figure 2:
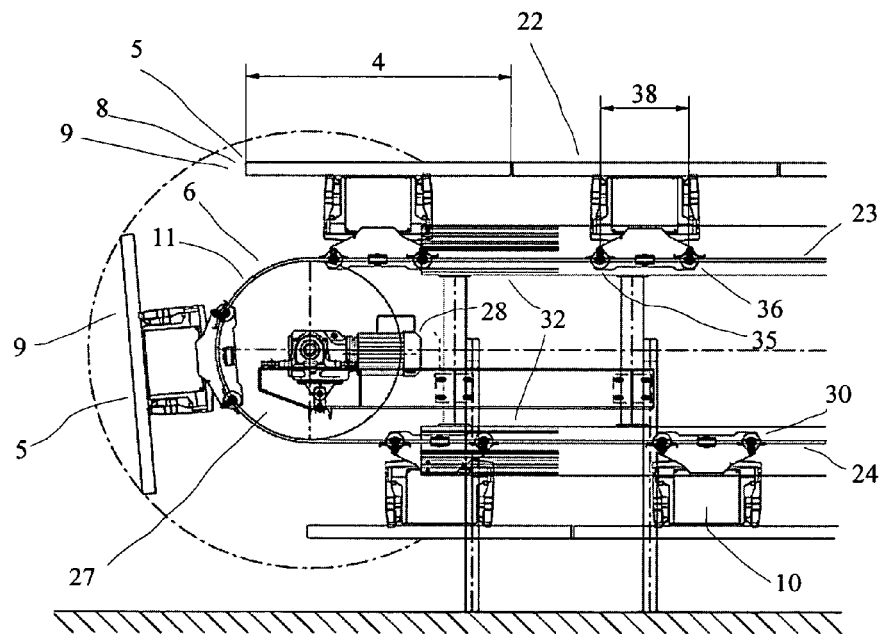
FIG. 2 an enlarged illustration of part of the sorting system according to FIG. 1.

FIGS. 1 and 2 illustrate a schematic side view of a sorting system 1 according to the invention comprising a vertical sorter 2 which is provided for conveying and sorting parcel goods 3. To this end the vertical sorter 2 comprises a plurality of sorting units 5 which are connected with one another via a closed conveyor belt 6 along a traveling path 7 and are movable along the traveling path 7.

Each of the sorting units 5 in the present embodiment comprises a carriage 30 which is attached to the conveyor belt 6 which is presently configured as a traction carrier 11, and a parcel goods receiver 8 mounted thereon which in the present embodiment is configured as a tilt tray 9.

The length of each of the sorting units 5 is presently substantially determined by the length of the tilt trays 9 and presently substantially corresponds to the distance 4 of two sorting units such that a substantially closed conveying surface 22 is achieved on the top face of the upper flight 23.

This offers the advantage among other things that two or more conveying units 5 may be employed for jointly conveying and sorting a parcel 3 which is longer than the distance 4 or the length of a sorting unit 5. For example if a parcel 3 is intended to be conveyed the length of which is one and one half of the length 4 of two sorting units, then the parcel 3 is placed on two sorting units 5 and transported by the two sorting units 5 until a signal to discharge the parcel 3 emits where both of the sorting units 5 place the parcel 3 in synchrony or offset in time.

In general, following a discharge signal the motor 10 of a sorting unit 5 is activated and the tilt tray 9 is tilted from the conveying position 21 to a delivery position or discharge position in which the parcel 3 lying on the tilt tray 9 glides down from the tilt tray 9 due to gravity and is delivered in the proper position.

In this way parcel goods 3 can be transferred between the ends 25 and 26 of the vertical sorter 2 specifically to any one of the delivery stations positioned in between. Furthermore the tilt trays 9 can be delivered to the side both to the one side 19 and to the other side 20.

The individual sorting units 5 are connected with one another along the circumference of the traveling path 7 via the conveyor belt 6 configured as a traction carrier 11 and are supported by the traction carrier 11.

The end 25 of the vertical sorter 2 is provided with a drive drum 27 which is driven via an electric motor 28. The traction carrier 11 which is prestressed at a considerable prestressing force is conveyed in the conveying direction 15 by the rotation of the drive drum 27. The conveying direction 15 may be reversed as required.

The other end 26 of the vertical sorter 2 in the present embodiment is provided with a reversing drum 29 which reverses the belt back in the direction of the first end 25. Other configurations may provide at the second end 26 an additional motor 28 controlled in synchrony with the motor 28 at the first end 25 to apply the drive torque at both ends 25 and 26 of the vertical sorter 2.

The carriage 30 of a sorting unit 5 is connected with the conveyor belt 6 at least at one connection point 18. The carriage 30 is equipped at both ends and on both sides with wheels 31 running on the sides 19 and 20 in guide rails 32 provided therefor so as to guide each of the sorting units 5 on the horizontal traveling paths between the two ends 25 and 26. In this way for one, the weight lying on the sorting units is discharged to the guide rail 32, and for another, vertical vibrations which may be caused by receiving and discharging parcel goods 3 are reduced.

In other configurations it is possible to provide two reversing stations in the lower flight 24 to turn the conveyor belt 6 by 180 degrees each such that the tilt trays 9 can receive parcel goods 3 in the lower flight as well so as to perform sorting not only in the area of the upper flight 23 but also in the area of the lower flight 24.

Figure 3:
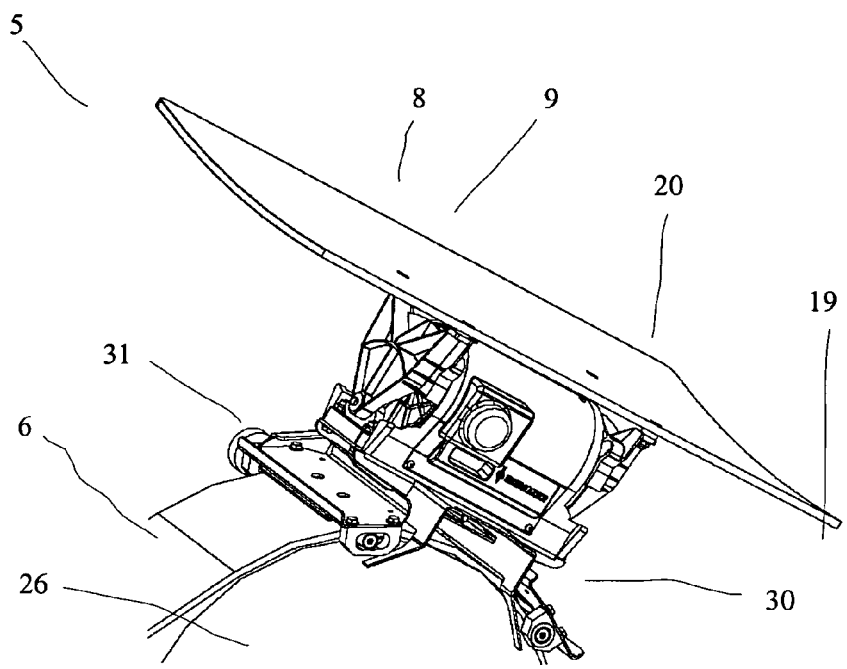
FIG. 3 a perspective view of a sorting unit of the sorting system according to FIG. 1.
Figure 4:
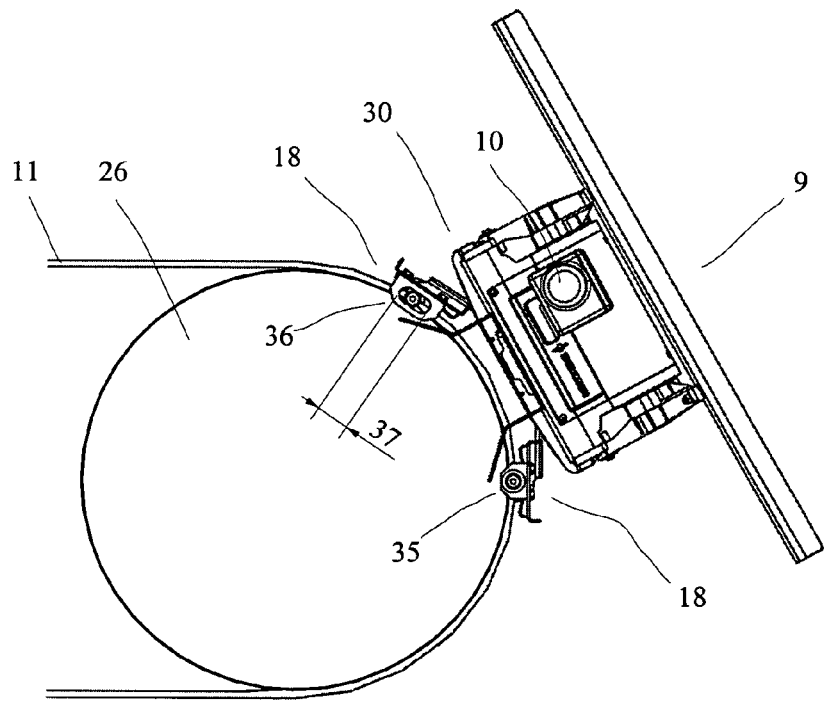
FIG. 4 a side view of a sorting unit of the sorting system according to FIG. 1.

FIG. 3 illustrates a perspective view of a sorting unit 5 of the sorting system and FIG. 4, a side view of the sorting unit 5 of the sorting system 1 according to FIG. 1.

The sorting units 5 comprise a carriage 30 on which the tilt trays 9 are disposed. The tilt trays 9 are electrically driven by the motor 10 and can selectively deliver a received parcel to the side 19 or to the other side 20.

The carriages 30 are each connected with the traction carrier 11 in two connection points 18 spaced apart from one another in the longitudinal direction by the distance 38.

At the first connection point 35 the carriage 30 is connected with the traction carrier to be free to rotate and stationary in place. This means that in particular no longitudinal displacement can occur in this place.

At the second connection point 36 the carriage 30 is also connected with the traction carrier 11 to be free to rotate. At this connection point 36 the rotary receiver is received displaceable by a displaceable length 37 along the traction carrier. Due to the longitudinal displaceability a polygonal effect can be avoided at the vertical reversing points at the ends 25 and 26 since a length adjustment occurs. Namely, although the tangent between the connection points 35 and 36 has a length different from the circumference segment, the carriage 30 can be in contact with the surface at all times. The ensuing difference in length is balanced by the displaceable length 37. An increased mechanical load on the traction carrier caused by a polygonal effect is avoided. The acoustic emission is also reduced in this way.

Also, the accelerations acting on the carriages 30 and the parcel goods receivers 8 in moving onto and off the reversing drums can be noticeably reduced in contrast to a fixed link.

In the vertical sorter 2 one seeks as a rule to have the lowest possible distances between the tilt trays 9 so as to obtain a substantially closed conveying surface 22. In this way one prevents for example parcel goods from extending downwardly through large gaps between tilt trays 9 where they might get jammed.

Figure 5:
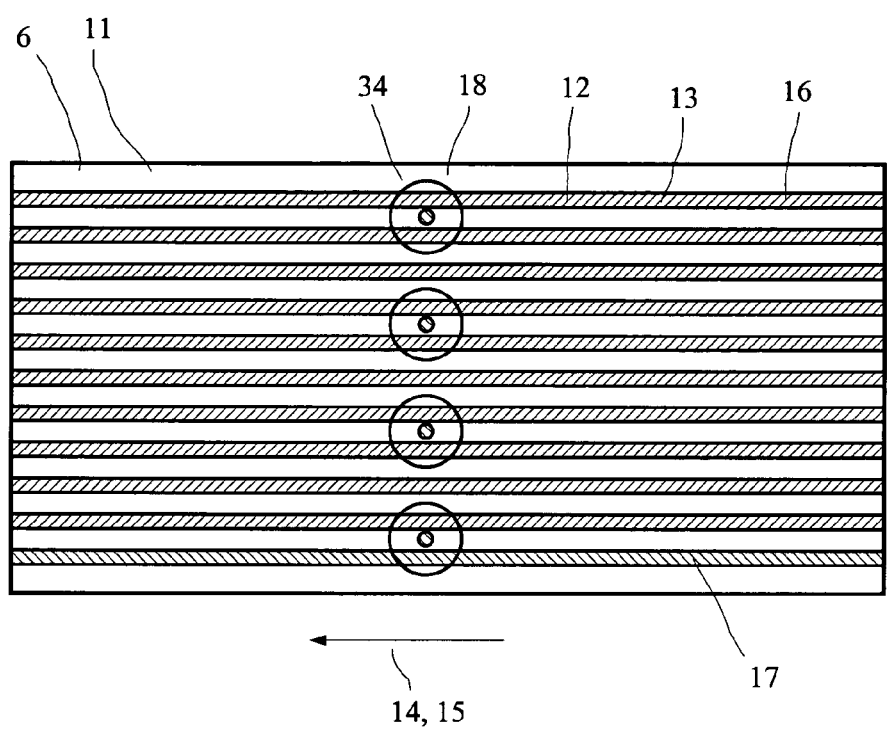
FIG. 5 a schematic view of a conveyor belt for a sorting system according to FIG. 1.

To ensure the required stability and load-bearing capacity of the conveyor belt 6 the conveyor belt 6 is configured as a traction carrier 11 and reinforced with reinforcing means 12 as can be taken from the illustration according to FIG. 5. Presently the reinforcing means 12 are configured as reinforcing cables 13 and consist in particular of steel ropes 16 embedded in the conveyor belt 6 configured as a traction carrier 11 adjacent or in particular parallel to one another.

Or else it is conceivable to incorporate in the traction carrier 11 reinforcing means 12 of reinforcing fibers 17 which result in reinforcement in the longitudinal direction 14 along the conveying direction 15.

Preferably a plurality of reinforcing cables 13 is provided closely adjacent to one another in the traction carrier 11 so as to achieve high stability in the longitudinal direction while retaining some space between the steel ropes 16 to provide screw connections 34 in connection points 18 for attaching the carriages 30 of the sorting units 5 to the traction carrier 11. Traction carriers reinforced by ropes and comprising rope-free zones to facilitate screw-connections are particularly preferably employed.

Figure 6:
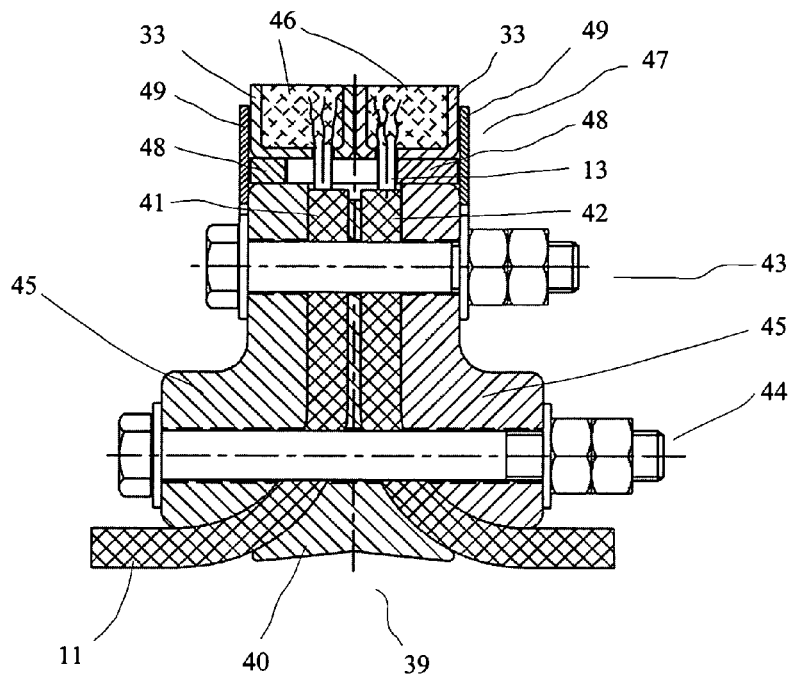
FIG. 6 a view of the connection point of the ends of the conveyor belt of the sorting system according to FIG. 1.

Preferably the two ends of the conveyor belt (not shown) are also attached to one another by screwed connections 34 as illustrated in FIG. 6.

As illustrated in FIG. 6, the belt ends 41 and 42 of the conveyor belt 6 configured as a traction carrier are connected with one another to be tension-proof at a belt connection 39.

A lower shaped part 40 in particular configured as a sword profile and two shaped parts 45 disposed opposite specifically divert the belt ends 41 and 42 approximately 90° outwardly. A plurality of screwed connections 43 and a plurality of screwed connections 44 are provided over the width of the traction carrier to ensure by means of two series-connected screwed connections 43 and 44 a tension-proof connection of the traction carrier 11 to withstand high and highest loads. Each of the screwed connections may be secured by a lock nut or the like.

Figure 7:
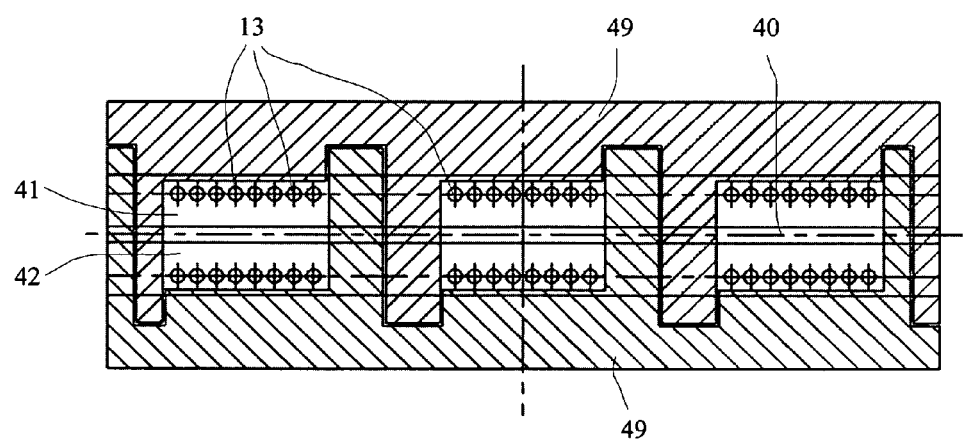
FIG. 7 a cross-section in the region of the cable connection according to FIG. 6.

As can be taken from FIGS. 6 and 7, the reinforcing cables emerging from one belt end each are connected with one another at each belt end 41 and 42 at a cable connection 47. To this end, single wires of adjacent or all of the reinforcing cables 13 of a belt end 41 or 42 are twisted with one another in this place.

Moreover the ends of the reinforcing cables 13 are received by one connection receiver each in the shape of a connection box 33 where they are potted with a binding agent 46. The binding agent 46 may be a resin or synthetic resin or another two-or multiple-component adhesive. Potting with a metal alloy is conceivable as well. It is important for the reinforcing cables to be separately connected with one another at each belt end 41, 42 such that the ends of the traction carrier 11 at the belt connection 39 are firmly but detachably connected with one another.

Spacers 48 in the shape of e.g. filling plates are provided which are exchangeably disposed at the cable connection 47. Selecting another spacer 48 having a desired thickness allows to adjust the length of the traction carrier 11 for example to specifically adjust the distances of the sorting units 5 at the belt connection 39.

On the whole the invention provides a sorting system in which even with high and highest prestresses there will be minimal elongation of the traction carrier of the conveyor belt 6 since due to the reinforcing means 12 the elongation of the traction carrier 11 in the longitudinal direction 14 is small and does not change with increasing operating life.

This offers the considerable advantage that the local elongation of the conveyor belt 6 over the traveling path 7 is nearly unchanged and independent of loads. In conveyor belts without reinforcing means the local elongation will change in dependence on the current load conditions such that the positions of beginning and end of a sorting unit may shift considerably if conveyor belts without reinforcing means are employed. This encumbers receiving and discharge of parcel goods to be sorted since the positions of the tilt trays of the sorting units are not defined precisely. The present invention offers the considerable advantage of greatly reducing these uncertainties. Moreover the sorting system according to the invention is designed for highest transporting and sorting speeds and for high and highest parcel goods weights.

REFERENCE NUMERALS 1 sorting system
2 vertical sorter
3 parcel goods
4 distance
5 sorting unit
6 conveyor belt
7 traveling path
8 parcel goods receiver
9 tilt tray
10 motor
11 traction carrier
12 reinforcing means
13 reinforcing cable
14 longitudinal direction
15 conveying direction
16 steel rope
17 reinforcing fiber
18 connection point
19 side
20 side
21 conveying position
22 conveying surface
23 upper flight
24 lower flight
25 end
26 end
27 drive drum
28 motor
29 reversing drum
30 carriage
31 wheel
32 guide rail
33 connection box
34 screws
35 first connection point
36 second connection point
37 displaceable length
38 distance
39 belt connection
40 shaped part
41 belt end
42 belt end
43 screwed connection
44 screwed connection
45 shaped part
46 binding agent
47 cable connection
48 spacer
49 supporting sheet

The invention claimed is:

1. A sorting system having a vertical sorter in particular for conveying and sorting parcel goods, comprising:
a plurality of sorting units provided at predetermined distances from one another extending along a traveling path over a closed conveyor belt and being connected with the conveyor belt and movable along the traveling path;
wherein at least two reversing drums having horizontal rotational axes are provided, at least one of which serves as a drive drum for reversing and driving about the horizontally oriented rotational axes the conveyor belt which is substantially disposed horizontally, and the sorting units provided thereon;
the conveyor belt is configured as a traction carrier to which end the conveyor belt is reinforced with at least one reinforcing cable is for driving the sorting units;
at least one sorting unit comprises at least one moving device having wheels and is connected with the traction carrier in two connection points spaced apart in the longitudinal direction; and
wherein the sorting units are coupled to the traction carrier in first connection points to be stationary but free to rotate and in second connection points to be longitudinally displaceable, the sorting unit comprising at least one parcel goods receiver which allows controlled discharge of a received parcel.

2. The sorting system according to claim 1 wherein the conveyor belt consists of an elastic material provided with the reinforcing means to allow high strength and prestress with little elongation, and wherein the at least one reinforcing cable is disposed in the longitudinal direction.

3. The sorting system according to claim 1 wherein the sorting unit is provided with a motor for discharging by way of motor control a parcel received by the parcel goods receiver.

4. The sorting system according to claim 1 wherein the sorting units are firmly connected with the traction carrier at least in one position and in particular screw-connected via a plurality of screws.

5. The sorting system according to claim 1 wherein the sorting units are coupled to the traction carrier in second connection points to be free to rotate.

6. The sorting system according to claim 1 wherein at least one parcel goods receiver is configured as a tilt tray which by means of the motor can be brought from a transport position to a discharge position inclined at least towards one of the sides.

7. The sorting system according to claim 1 wherein at least one parcel goods receiver comprises a cross conveyor for controlled discharge of a received parcel by means of a motor.

8. The sorting system according to claim 7 wherein the parcel goods receivers of the sorting units form a substantially closed conveying surface in an upper flight.

9. The sorting system according to claim 1 wherein at least one height difference is provided along the traveling path in an upper flight.

10. The sorting system according to claim 1 wherein the wheels are guided in guide rails at least in the longitudinal sections.

11. The sorting system according to claim 1 wherein horizontal and vertical wheels are provided to allow vertical and horizontal support.

12. The sorting system according to claim 1 wherein non-contact power transmission to the sorting units is provided for supplying the motor of the parcel goods receiver with power.

13. The sorting system according to claim 1 wherein mechanical triggering of the sorting units is provided, which is controlled by means of mechanical trigger units at the frame.

14. The sorting system according to claim 1 wherein reinforcing cables emerge from one belt end where they are interconnected at a cable connection wherein in particular the reinforcing cables emerging at the belt end are twisted with one another.

15. The sorting system according to claim 14 wherein the reinforcing cables are potted with a binding agent at a connection box wherein in particular each of the reinforcing cables of the two belt ends is separately potted with a binding agent.

16. The sorting system according to claim 1 wherein exchangeable spacers can be inserted to allow defined adjustment of the belt length at the cable connection.

17. The sorting system according to claim 1 wherein at least one sorting unit is provided with at least one conveyor belt running opposite the conveying direction and which is in particular disposed on the side next to the conveyor belt.

\* \* \* \* \*